United States Patent Office.

JAMES M. FERGUSON, OF SUMMIT, MISSISSIPPI.

Letters Patent No. 96,215, dated October 26, 1869.

IMPROVED MEDICAL COMPOUND FOR THE CURE OF FEVER AND AGUE.

The Schedule referred to in these Letters Patent and making part of the same.

To all whom it may concern:

Be it known that I, JAMES M. FERGUSON, of Summit, in the county of Pike, and State of Mississippi, have invented a new and improved Medical Compound for the Cure of Ague and Chills and Fevers; and I do hereby declare that the following is a full, clear, and exact description thereof.

My invention consists in a combination of the following ingredients, viz:

Iodide of potassium, two drachms.
Sulphate of quinia, two scruples.
Aromatic sulphuric acid, *quantum sufficit.*
Distilled water, six ounces.

I compound the above as follows: First dissolve the iodide of potassium in three ounces of the water, then dissolve the quinia in the acid, and add, when dissolved, the remaining three ounces of water, and lastly add the two preparations together.

Having thus fully described my invention,

What I claim as new, and desire to secure by Letters Patent, is—

The several ingredients forming the compound for the cure of ague and chills and fevers, as herein specified.

JAMES M. FERGUSON.

Witnesses:
G. H. LADLEY,
THOS. R. STOCKDALE.